(12) United States Patent
Acosta et al.

(10) Patent No.: US 7,209,474 B2
(45) Date of Patent: Apr. 24, 2007

(54) WIRELESS SERVICES PROVIDER NETWORK SYSTEM AND METHOD

(75) Inventors: Edward Acosta, Austin, TX (US); David Thompson, Austin, TX (US)

(73) Assignee: Byte Mobile, Inc.

( * ) Notice: Subject to any disclaimer, the term of this patent is extended or adjusted under 35 U.S.C. 154(b) by 31 days.

(21) Appl. No.: 09/917,449

(22) Filed: Jul. 27, 2001

(65) Prior Publication Data

US 2004/0196815 A1 Oct. 7, 2004

Related U.S. Application Data

(60) Provisional application No. 60/180,649, filed on Feb. 7, 2000, provisional application No. 60/177,329, filed on Jan. 21, 2000.

(51) Int. Cl.
*H04L 12/66* (2006.01)
*H04J 3/16* (2006.01)
*H04J 3/22* (2006.01)

(52) U.S. Cl. ............... 370/352; 370/354; 370/355; 370/356; 370/466

(58) Field of Classification Search ........ 370/352–356, 370/395.5, 395.52, 230, 259, 310, 322, 338, 370/348, 400, 401, 466; 709/217, 219, 225, 709/226, 229, 230, 203, 212
See application file for complete search history.

(56) References Cited

U.S. PATENT DOCUMENTS

| | | | | |
|---|---|---|---|---|
| 5,673,322 A | * | 9/1997 | Pepe et al. | 705/52 |
| 5,905,719 A | * | 5/1999 | Arnold et al. | 370/330 |
| 5,983,073 A | * | 11/1999 | Ditzik | 455/11.1 |
| 6,034,621 A | * | 3/2000 | Kaufman | 340/7.21 |
| 6,119,167 A | * | 9/2000 | Boyle et al. | 709/234 |
| 6,148,405 A | * | 11/2000 | Liao et al. | 713/201 |
| 6,166,729 A | * | 12/2000 | Acosta et al. | 715/719 |
| 6,275,575 B1 | * | 8/2001 | Wu | 379/202.01 |
| 6,292,833 B1 | * | 9/2001 | Liao et al. | 709/229 |
| 6,301,245 B1 | * | 10/2001 | Luzeski et al. | 370/352 |
| 6,618,709 B1 | * | 9/2003 | Sneeringer | 705/412 |
| 2001/0030850 A1 | * | 10/2001 | Ditzik | 361/683 |

* cited by examiner

*Primary Examiner*—Chirag G. Shah
(74) *Attorney, Agent, or Firm*—The Law Firm of H. Dale Langley, Jr., P.C.

(57) ABSTRACT

An application service provider provides wireless access to a packetized data network, such as the Internet. The application service provider includes a server computer. The server computer is connected to the network, which is at least in part a wired network. The wired network is connected to a cellular wireless communications system. Data is communicated over the network, both wired and wireless, via OSI models, for example, according to TCP/IP protocols or specialized variants. A wireless device, such as a modem-equipped laptop computer or personal digital assistant, a web-enabled telephone, or the like, is communicatively connected to the cellular wireless communications system. The application service provider can maintain a website, including targeted content, on the server computer for access by the wireless device.

8 Claims, 1 Drawing Sheet

WIRELESS SERVICES PROVIDER NETWORK SYSTEM AND METHOD

CROSS-REFERENCE TO ADDITIONAL RELATED APPLICATIONS

The present application is related to U.S. patent application (CPA) Ser. No. 08/852,557, entitled "Remote Digital Image Viewing System and Method", filed May 7, 1997 (CPA filed Oct. 26, 1999); U.S. Provisional Patent Application No. 60/177,329, entitled "Wireless Network System and Method", filed Jan. 21, 2000; and U.S. Provisional Patent Application No. 60/180,649, entitled "Digital Image Transfer System and Method", filed Feb. 7, 2000 each of the same inventor hereof, and those respective applications are incorporated herein.

BACKGROUND OF THE INVENTION

The present invention generally relates to communications systems and methods and, more particularly, relates to wireless packetized data communications providers and services and systems and methods therefor.

Wireless packetized data communications are becoming increasingly common. For example, certain cellular telephones can presently receive and display limited textual content. Some pagers presently have limited text messaging capabilities. Wireless modems can equip computing devices, such as laptop computers, personal digital assistants, and the like, for communicating over networks, such as the Internet, through wireless channels.

The presently available wireless packetized data communications are all severely restricted in capabilities because of bandwidth limitations of wireless channels for the communications. Conventional wireless modems typically communicate at about 9600 bits/second. Only small quantities of information can be communicated at such rate within reasonable time periods. Also, the wireless channels present quality of communication and interruption concerns.

Certain specialized formats and standards are presently employed and being refined for wireless data communications. One such format, Wireless Application Protocol (WAP), is being used for wireless communications over the Internet. The WAP protocol exhibits many of the same problems as the other wireless communications, including that only limited amounts of information can reasonably be communicated according to the protocol because of wireless bandwidth limitations.

It would be a significant improvement in the art and technology to provide improved wireless packetized data communications, including communications over the Internet and other networks.

SUMMARY OF THE INVENTION

An embodiment of the invention is a wireless communications network. The wireless communications network includes a wired network, a wireless channel, a wireless application service provider server computer connected to the wired network, a wireless packetized data communications provider equipment connected to the wired network, and a wireless device communicatively connected via the wireless channel to the wireless packetized data communications provider.

Another embodiment of the invention is a method of wireless communications. The method includes serving data over a wired network, receiving the data from the wired network, transmitting the data over a wireless channel, and receiving the data over the wireless channel. In other aspects, the method includes transmitting second data over a wireless channel, receiving the second data from the wireless channel, transmitting the second data over the wired network, and receiving the second data over the wired network.

Yet another embodiment is a computer readable substrate having a computer program saved thereupon. The computer program includes providing a wireless device with an on-line access to a website, the website maintained on a server computer connected to a wired network, transmitting a packetized data to the wireless device at least in part over a wireless channel, receiving the packetized data by the wireless device, transmitting a second packetized data to the server computer at least in part over a wireless channel, and receiving the second packetized data by the server computer.

Another embodiment of the invention is an application service provider for providing network access. The application service provider includes a server computer, a wired network connected to the server computer, a cellular wireless communications system connected to the wired network, and a wireless device communicatively connected to the cellular wireless communications system.

BRIEF DESCRIPTION OF THE DRAWINGS

The present invention is illustrated by way of example and not limitation in the accompanying figures, in which like references indicate similar elements, and in which.

DETAILED DESCRIPTION OF PREFERRED EMBODIMENTS

Figure 1:
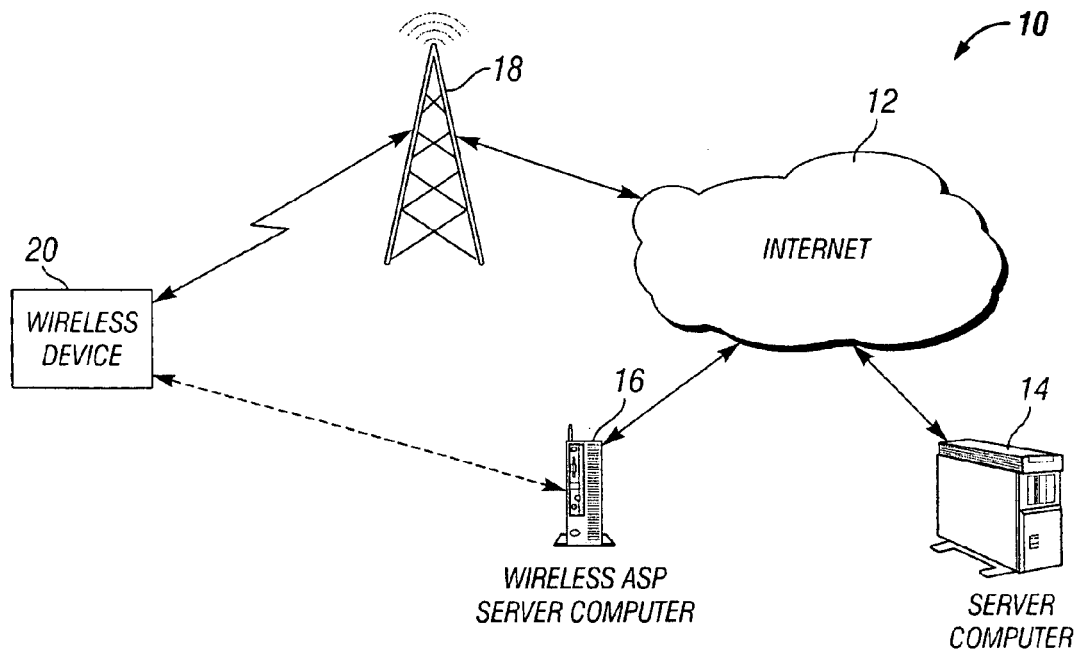
FIG. 1 illustrates a wireless application service provider (ASP) system.

Referring to FIG. 1, a system 10 serves as a wireless application service provider (ASP). The system 10 includes a network, such as the Internet 12. The network is operable according to a packetized data protocol, such as transport control protocol/Internet protocol (TCP/IP) or some other network protocol. The network, such as the Internet 12, interconnects various computing and communications devices, for example, among other devices, a server computer 14 and a wireless ASP server computer 16. The server computer 14 and the wireless ASP server computer 16 are each one or more server computers including a microprocessor, memory storage, and communications capabilities via wire or wireless connection with the Internet 12. The server computer 14 and the wireless ASP server computer 16 communicate over the Internet 12 or other network via the protocol of the network.

The network, such as the Internet 12, is also connected with a wireless communications service provider 18. The wireless communications service provider 18 is, for example, a cellular or other packetized data wireless communications network. The wireless service provider 18 connects by wire connection with the network, such as the Internet 12. Alternatively, the wireless communications service provider 18 could connect with the network 12 by other communications connection, such as fiber optic, coax cable, wireless channel, or other communications connection.

The wireless service provider 18 is capable of communicating through wireless channels with various devices, such as a wireless device 20. The wireless device 20 is a processing device, such as a data-enabled cellular telephone, a personal digital assistant, a laptop computer, or any of a wide variety of other processing devices that can wirelessly communicate with the wireless service provider 18. Of course, the wireless device 20 includes communications equipment for accomplishing the wireless communication with the wireless service provider 18, such as wireless modem.

The wireless device 20 communicates through the wireless service provider 18 and over the network, such as the Internet 12, with the wireless ASP server computer 16. The wireless ASP server computer 16 serves as a dedicated server for the wireless device 20 in its communications. The wireless ASP server computer 16 sends and receives communications to and from the wireless device 20 over the network, such as the Internet 12, and on through the wireless service provider 18. The wireless ASP server computer 16 also communicates over the network, such as the Internet 12, with other network connected devices, such as the server computer 14, via protocols in communications channels enabled for such communications on the network. In certain embodiments, for example, the wireless ASP server computer 16 and the wireless device 20 communicate with specialized protocols, such as optimized packetized data protocols, for example, optimized TCP/IP protocols or other protocols such as described in the related patent applications.

Figure 2:
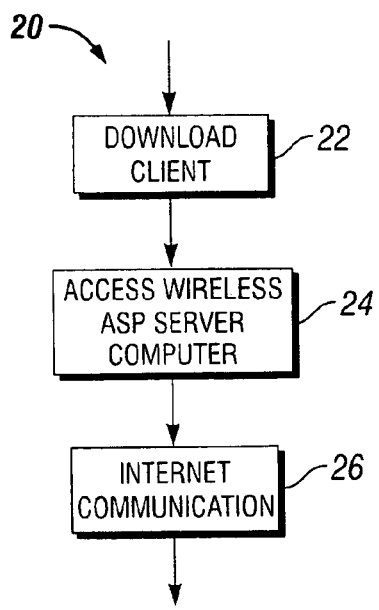
FIG. 2 illustrates a method operable on a wireless device for packetized data communications via the system of FIG. 1.

Referring to FIG. 2, a method 20 is performed by the wireless device 20. The wireless device 20 initially contacts the wireless ASP server computer 16, for example, over the network, such as the Internet 12, or is otherwise able to access the wireless ASP server computer 16 or its administrator, in order to obtain a software client for performing appropriate protocols for wireless communications between the wireless device 20 and the wireless ASP server computer 16. For example, in a step 22, the wireless device 20 downloads from the wireless ASP server computer 16 a client software that enables operations of the wireless device 20 in communications with the wireless ASP server computer 16 according to the particular protocols. As shown in phantom in FIG. 1, the wireless device 20 most likely directly accesses the wireless ASP server computer 16, such as by wired connection, to download the client software. Alternative means for download of the client software in the step 22 are possible, however, such as storage devices containing the client software can load on or make available the client software to the wireless device 20, for example, via a floppy disk or other storage mechanism.

In a step 24, after installing the client software at the wireless device 20, the wireless device 20 communicates via wireless communication with the wireless services provider 18. The wireless services provider 18 in the step 24 communicates over the network, such as the Internet 12, to the wireless ASP server computer 16, the communication from the wireless device 20. As mentioned, this communication can be performed according to specialized protocols, such as described in the related applications. Alternatively, other protocols can be employed for the initial accessing by the wireless device 20 of the wireless ASP server computer 16 in such manner.

Thereafter, in a step 26, the wireless device 20 communicates with the wireless ASP server computer 16 through the wireless channel between the wireless device 20 and the wireless service provider 18, and through the network, such as the Internet 12, between the wireless service provider 18 and the wireless ASP server computer 16. The communications in the step 26 are made according to protocols of the client software and acceptable for such communications by the wireless device 20 and the wireless ASP server computer 16. In certain embodiments, the particular protocols for such communications between the wireless device 20 and the wireless ASP server computer 16 are those protocols described in the related applications and maximized for packetized data communications systems. It is to be noted that, although the wireless device 20 and the wireless ASP server computer 16 communicate therebetween via particular protocols, the wireless ASP server computer 16 is capable of communicating with network protocols, such as protocols of the Internet 12, with other attached devices on the network. For example, the wireless device 20 can communicate a message to the wireless ASP server computer 16 according to the particular specialized protocol. The wireless ASP server computer 16 can then communicate the message to, for example, the server computer 14, over the network, for example the Internet 12, via the typical protocols followed by the network, such as TCP/IP in the case of the Internet 12.

Figure 3:
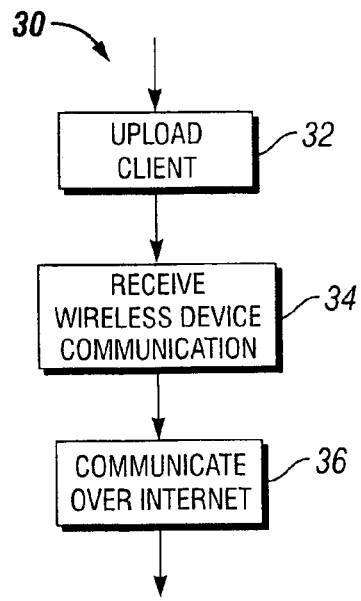
FIG. 3 illustrates a method of operation of a wireless ASP server computer of the system of FIG. 1.

Referring to FIG. 3, a method 30 is performed by the wireless ASP server computer 16. In the method 30, the wireless ASP server computer 16 uploads the client software to the wireless device 20 upon request by the wireless device 20. Alternatively, the step 32 can be performed in other manner, including by some device other than the wireless ASP server computer 16 or in some other context, such as the administrator of the wireless ASP server computer 16 can deliver a disk containing the client software to the operator of the wireless device 20 for load and installation in typical manner on the wireless device 20. Of course, all other possible alternatives for achieving the same result are included in the possible embodiments.

Thereafter, in a step 34, the wireless ASP server computer 16 receives an initial communication from the wireless device 20, which communication has traveled wirelessly to the wireless service provider 18 and then over the network, such as the Internet 12. The communication from the wireless device 20 initiates communications between the wireless device 20 and the wireless ASP server computer 16. Those communications between the wireless device 20 and the wireless ASP server computer 16 can, of course, as has been described herein, be made according to the specialized protocols in order to optimize the wireless communications.

In a step 36, the wireless ASP server computer 16 communicates over the network, such as the Internet 12, with other devices, for example, the server computer 14. These communications over the network proceed according to typical network protocols. The communications over the network in the step 36 can include communications intended for and received from the wireless device 20. In effect, the wireless device 20 delivers and receives messages to and from the wireless ASP server computer 16, and the wireless ASP server computer 16 forwards and receives on behalf of the wireless device 20 those messages over the network to network connected devices.

In operation of the system 10 and the methods 20, 30, numerous alternative business and technical arrangements are possible. In certain embodiments, the administrator of the wireless ASP server computer 16 can provide select interfaces and content to the wireless device 20. For example, the wireless device 20 can be equipped with a form of World Wide Web (WWW) browser that performs according to the specialized protocols for the communications between the wireless device 20 and the wireless ASP server computer 16. In such instance, the wireless ASP server computer 16 can provide to the wireless device 20 according to those same specialized protocols various data and information, including such things as graphics, images, voice, text, and other digitally represented information and matters.

The wireless ASP server computer 16 must also, however, be capable of communicating via typical network protocols with other network connected devices in order to receive and deliver messages from and to those network connected devices, and then transfer those messages on or receive those messages from the wireless device 20, as appropriate.

Although a single wireless device 20, a single wireless ASP server computer 16, a single wireless service provider 18, a single server computer 14, and a single network, such as the Internet 12, have been described with regard to the embodiments, it is to be expressly understood that combinations of those elements, such as a plurality of any, certain ones, or all of those elements, is possible in keeping with the scope of the embodiments herein. The network could be an intranet, or even an intranet combination or intranet-extranet combination. Numerous banks of the wireless ASP server computer 16 can be possible for receiving communications from pluralities of wireless devices, and the wireless ASP server computers can be centrally located or distributed through a wide geographic area. In the case of a global network such as the Internet, the network is capable of communicating by its protocols, which may include other specialized protocols for specific situations. The wireless ASP server computer in such instance can communicate with various devices on the network according to those other specialized protocols, if properly equipped as would be known to those skilled in the art. In general, the communications between the wireless device or devices and the wireless ASP server computer or computers occurs according to optimized protocols for wireless communications. These optimized protocols can be implemented entirely in software or alternatively can be hardware, combinations of hardware and software, or other mechanisms. The protocols of the hardware or software, as the case may be, for the wireless communications will, in any event, provide increased communications efficiency, speed, and adaptation for the wireless environment.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems and any element(s) that may cause any benefit, advantage, or solution to occur or become more pronounced are not to be construed as a critical, required, or essential feature or element of any or all the claims. As used herein, the terms "comprises, comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A wireless communications network, comprising:
   a wired network;
   a wireless channel;
   a wireless application service provider server computer connected to the wired network, operating via network protocols of the wired network for wired communications over the wired network, and operatively dedicated for effecting communications over the wireless channel via specialized transport layer protocols of the wireless channel for wireless communications over the wireless channel;
   a wireless packetized data communications provider equipment connected to the wireless application service provider server computer, for effecting communications of the server computer over the wireless channel in accordance with the specialized transport layer protocols of the wireless channel; and
   a wireless device for communicating over the wireless channel, via the wireless packetized data communications provider equipment in accordance with the specialized transport layer protocols of the wireless channel, with the server computer;
   the server computer is dedicated for communications with the wireless device, through the provider equipment over the wireless channel, via the specialized transport layer protocols;
   the server computer intermediates communications of the wireless device to be carried over the wired network, by communicating with the wireless device via the specialized transport layer protocols and correspondingly communicating over the wired network via the network protocols of the wired network;
   the specialized transport layer protocols for communications on the wireless channel reduce acknowledgement communications required per the network protocols of the wired network.

2. The wireless communications network of claim 1, further comprising a client software stored on the wireless device for enabling wireless communications over the wireless channel by the wireless device with the server computer, via the provider equipment, according to the specialized transport layer protocols of the wireless channel.

3. The wireless communications network of claim 2, the wired network operates according to an open systems interconnect model protocol.

4. The wireless communications network of claim 2, the wired network is Internet.

5. The wireless communications network of claim 1, the wireless channel is a cellular packetized data system.

6. The wireless communications network of claim 1, the wireless channel is a CDPD system.

7. The wireless communications network of claim 2, further comprising:
   a server software operable on the wireless application service provider server computer for enabling wireless communications via the specialized transport layer protocols of the wireless channel, between the server computer and the wireless device, having the client software, over the wireless channel.

8. The wireless communications network of claim 1, further comprising:
   a manager, connected to the wireless channel, for varying communications via the specialized transport layer protocols of the wireless channel, between the wireless device and the server computer in accordance with characteristics of the wireless channel.

* * * * *